US012455337B2

(12) United States Patent
Kung et al.

(10) Patent No.: US 12,455,337 B2
(45) Date of Patent: Oct. 28, 2025

(54) CURRENT SENSING CALIBRATION METHOD AND CURRENT SENSING CALIBRATION SYSTEM CAPABLE OF CORRECTING TEMPERATURE DATA ERRORS

(71) Applicant: HIMAX TECHNOLOGIES LIMITED, Tainan (TW)

(72) Inventors: Te-Chieh Kung, Tainan (TW); Ming-Chia Chen, Tainan (TW); Hugo Cruz, Tainan (TW); Hao-Wei Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 156 days.

(21) Appl. No.: 18/581,391

(22) Filed: Feb. 20, 2024

(65) Prior Publication Data
US 2025/0035730 A1 Jan. 30, 2025

Related U.S. Application Data

(60) Provisional application No. 63/528,656, filed on Jul. 25, 2023.

(51) Int. Cl.
*G01R 35/00* (2006.01)
*G01R 19/00* (2006.01)

(52) U.S. Cl.
CPC ....... *G01R 35/005* (2013.01); *G01R 19/0092* (2013.01)

(58) Field of Classification Search
None
See application file for complete search history.

(56) References Cited

U.S. PATENT DOCUMENTS

2006/0280360 A1* 12/2006 Holub .................. H04N 23/88
382/162

* cited by examiner

*Primary Examiner* — Farhana A Hoque
(74) *Attorney, Agent, or Firm* — Winston Hsu (57) ABSTRACT

A current sensing calibration method includes setting a first calibration current, inputting the first calibration current to a current sensing circuit for detecting a first real digital code, acquiring offset calibration data according to the first real digital code and a first ideal digital code corresponding to the first calibration current, setting a second calibration current and a third calibration current, inputting the second calibration current to the current sensing circuit for detecting a second real digital code, inputting the third calibration current to the current sensing circuit for detecting a third real digital code, acquiring gain calibration data according to the second real digital code, the third real digital code, a second ideal digital code, and a third ideal digital code, and acquiring channel temperature calibration data after the current sensing circuit is calibrated according to the offset calibration data and the gain calibration data.

20 Claims, 8 Drawing Sheets

CURRENT SENSING CALIBRATION METHOD AND CURRENT SENSING CALIBRATION SYSTEM CAPABLE OF CORRECTING TEMPERATURE DATA ERRORS

CROSS REFERENCE TO RELATED APPLICATIONS

This application claims the benefit of U.S. Provisional Application No. 63/528,656, filed on Jul. 25, 2023. The content of the application is incorporated herein by reference.

BACKGROUND OF THE INVENTION

1. Field of the Invention

The present invention illustrates a current sensing calibration method and a current sensing calibration system, and more particularly, a current sensing calibration method and a current sensing calibration system capable of correcting temperature data errors.

2. Description of the Prior Art

With the rapid development of technologies, various micro-light-emitting diode (micro-LED) devices are popularly adopted in our daily life. Since temperature variations may be introduced under different environments, a biased white point effect of the micro-LED devices may occur. The biased white point effect of the micro-LED devices may cause unstable color temperature and brightness of a light signal emitted by the micro-LED devices. Currently, detecting the temperature of the micro-LED device for calibrating the light signal is a major technology against the biased white point effect.

However, since components of detecting the temperature of the micro-LED device may be mismatched, the temperature data error may be introduced. When the temperature data error is introduced, the accuracy of calibrating the light signal of the micro-LED device is decreased.

Therefore, developing a temperature data error correction mechanism for improving the accuracy of calibrating the light signal of the micro-LED device is an important issue.

SUMMARY OF THE INVENTION

In an embodiment of the present invention, a current sensing calibration method is disclosed. The current sensing calibration method comprises setting a first calibration current according to a current range of a display panel, inputting the first calibration current to a current sensing circuit and detecting a first real digital code outputted from the current sensing circuit, acquiring offset calibration data according to the first real digital code and a first ideal digital code corresponding to the first calibration current, setting a second calibration current and a third calibration current according to the current range of the display panel, inputting the second calibration current to the current sensing circuit and detecting a second real digital code outputted from the current sensing circuit, inputting the third calibration current to the current sensing circuit and detecting a third real digital code outputted from the current sensing circuit, acquiring gain calibration data according to the second real digital code, the third real digital code, a second ideal digital code corresponding to the second calibration current, and a third ideal digital code corresponding to the third calibration current, and acquiring channel temperature calibration data of at least one pixel of the display panel after the current sensing circuit is calibrated according to the offset calibration data and the gain calibration data.

In an embodiment of the present invention, a current sensing calibration system is disclosed. The current sensing calibration system comprises at least one pixel disposed on a display panel, a multiplexer coupled to the at least one pixel and a current calibration terminal, a current sensing circuit coupled to the multiplexer and configured to generate digital data associating with a temperature of the at least one pixel, and a processor coupled to the current sensing circuit and configured to calibrate the digital data of the current sensing circuit. The processor sets a first calibration current according to a current range of the display panel. The first calibration current is inputted to the current calibration terminal and received by the current sensing circuit through the multiplexer. The processor detects a first real digital code outputted from the current sensing circuit. The processor acquires offset calibration data according to the first real digital code and a first ideal digital code corresponding to the first calibration current. The processor sets a second calibration current and a third calibration current according to the current range of the display panel. The second calibration current is inputted to the current calibration terminal and received by the current sensing circuit through the multiplexer. The processor detects a second real digital code outputted from the current sensing circuit. The third calibration current is inputted to the current calibration terminal and received by the current sensing circuit through the multiplexer. The processor detects a third real digital code outputted from the current sensing circuit. The processor acquires gain calibration data according to the second real digital code, the third real digital code, a second ideal digital code corresponding to the second calibration current, and a third ideal digital code corresponding to the third calibration current. The processor acquires channel temperature calibration data of the at least one pixel of the display panel after the current sensing circuit is calibrated according to the offset calibration data and the gain calibration data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
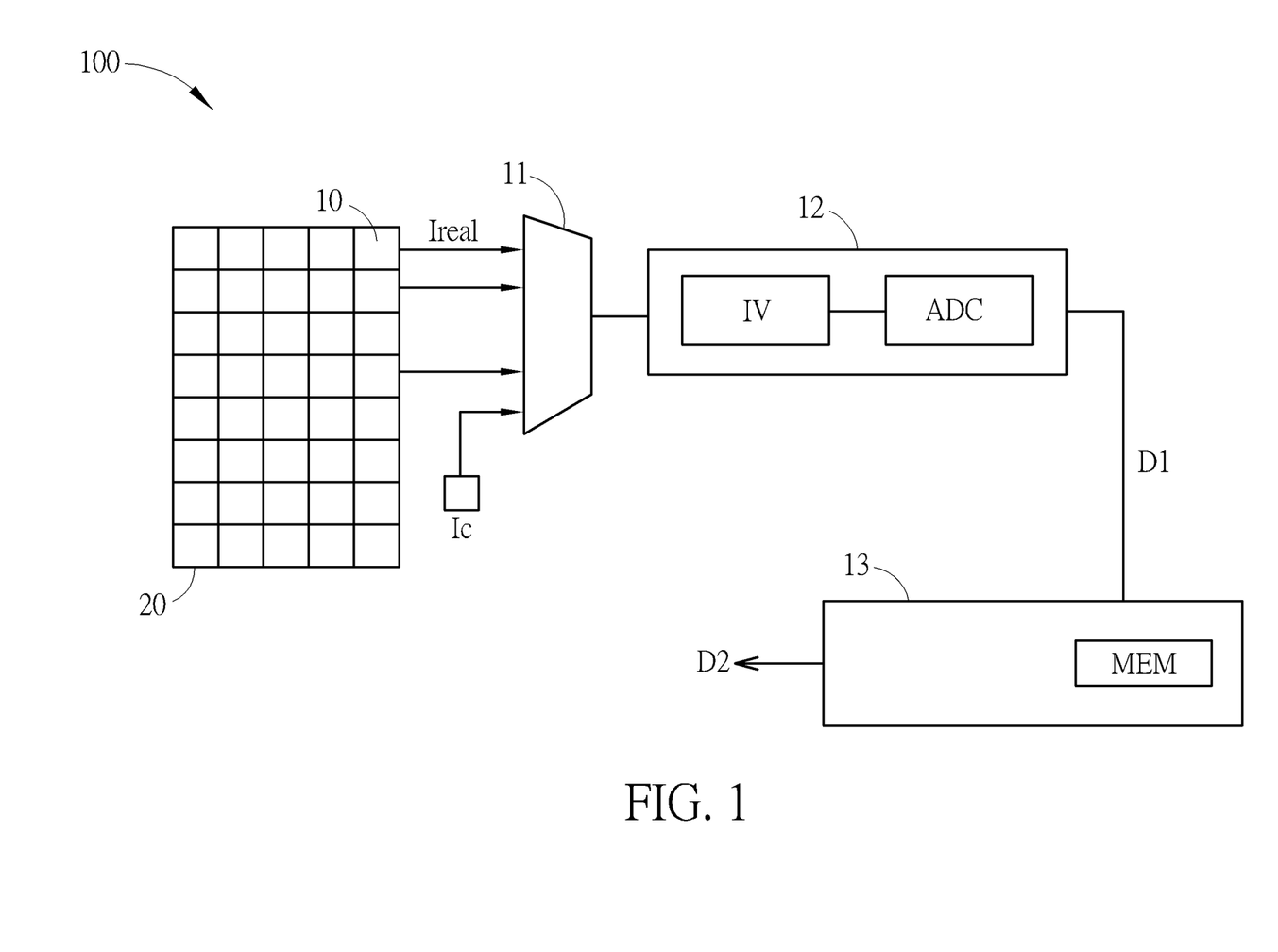
FIG. 1 is a block diagram of a current sensing calibration system according to an embodiment of the present invention.

FIG. 1 is a block diagram of a current sensing calibration system 100 according to an embodiment of the present invention. The current sensing calibration system 100 includes at least one pixel 10 disposed on a display panel 20, a multiplexer 11 coupled to the at least one pixel 10 and a current calibration terminal Ic, a current sensing circuit 12 coupled to the multiplexer 11 and configured to generate digital data D1 associated with a temperature of the at least one pixel 10, and a processor 13 coupled to the current sensing circuit 12 and configured to calibrate the digital data D1 generated by the current sensing circuit 12. In the current sensing calibration system 100, since components of detecting the temperature of the display panel 20 may be mismatched (i.e., for example, a current-to-voltage converter IV and an analog-to-digital converter ADC), the current sensing circuit 12 may output an erroneous digital code. Particularly, the error digital code can be corrected in the current sensing calibration system 100. In the current sensing calibration system 100, the processor 13 can set a first calibration current according to a current range of the display panel 20. Here, since the lifetime and manufacturing processing of the display panel 20 may be changed. In an embodiment, the processor 13 can select an appropriate current range configuration for determining the first calibration current according to Table T1.

TABLE T1

| Setting | Current range | Unit |
|---|---|---|
| 1 | 0~1 | uA |
| 2 | 0~10 | uA |
| 3 | 0~50 | uA |

Then, the first calibration current is inputted to the current calibration terminal Ic and received by the current sensing circuit 12 through the multiplexer 11. The processor 13 detects a first real digital code outputted from the current sensing circuit 12. The processor 13 acquires offset calibration data according to the first real digital code and a first ideal digital code corresponding to the first calibration current. Then, the processor 13 sets a second calibration current and a third calibration current according to the current range of the display panel 20. The second calibration current is inputted to the current calibration terminal Ic and received by the current sensing circuit 12 through the multiplexer 11. The processor 13 detects a second real digital code outputted from the current sensing circuit 12. The third calibration current is inputted to the current calibration terminal Ic and received by the current sensing circuit 12 through the multiplexer 11. The processor 13 detects a third real digital code outputted from the current sensing circuit 12. The processor 13 acquires gain calibration data according to the second real digital code, the third real digital code, a second ideal digital code corresponding to the second calibration current, and a third ideal digital code corresponding to the third calibration current. Finally, the processor 13 acquires channel temperature calibration data of the at least one pixel 10 of the display panel 20 after the current sensing circuit 12 is calibrated according to the offset calibration data and the gain calibration data. Details of the current sensing calibration method are illustrated below.

Figure 2A:
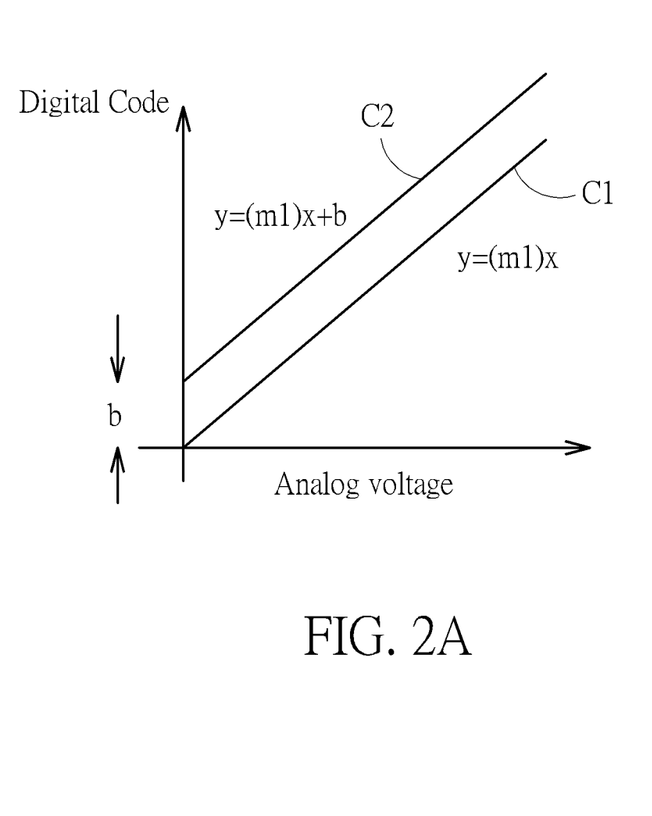
FIG. 2A is an illustration of an offset error of a current sensing circuit of the current sensing calibration system in FIG. 1.

FIG. 2A is an illustration of an offset error of the current sensing circuit 12 of the current sensing calibration system in FIG. 1. As previously mentioned, since components of detecting the temperature of display panel 20 may be mismatched (i.e., for example, the current-to-voltage converter IV and the analog-to-digital converter ADC), the current sensing circuit 12 may output an erroneous digital code. The error of the digital code is introduced due to the offset error and a gain error. In FIG. 2A, the offset error b is illustrated. X-axis is an analog voltage inputted to the analog-to-digital converter ADC of the current sensing circuit 12. Y-axis is the digital code outputted from the current sensing circuit 12. A transfer line C1 can be regarded as an ideal transfer line, denoted as y=(m1)x. Here, m1 is a slope of the transfer line C1. A transfer line C2 can be regarded as a real transfer line by introducing the offset error b, denoted as y=(m1)x+b.

Figure 2B:
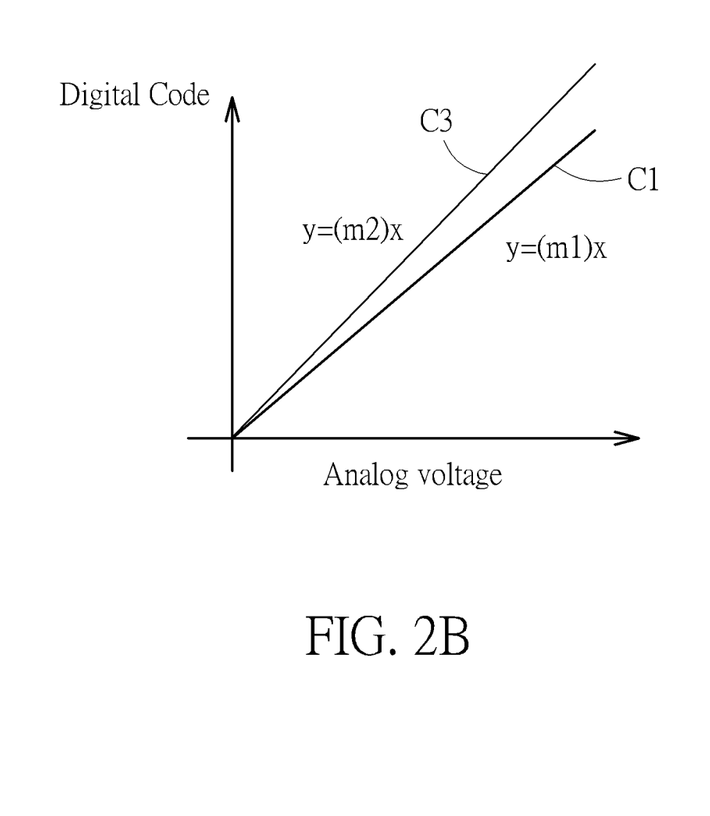
FIG. 2B is an illustration of a gain error of a current sensing circuit of the current sensing calibration system in FIG. 1.

FIG. 2B is an illustration of the gain error of the current sensing circuit 12 of the current sensing calibration system in FIG. 1. In FIG. 2B, X-axis is the analog voltage inputted to the analog-to-digital converter ADC of the current sensing circuit 12. Y-axis is the digital code outputted from the current sensing circuit 12. The transfer line C1 can be regarded as the ideal transfer line, denoted as y=(m1)x, as shown in FIG. 2A and FIG. 2B. A transfer line C3 can be regarded as a real transfer line by introducing the gain error, as y=(m2)x. Here, m2 is the slope of the transfer line C3. Since the slope m1 of the transfer line C1 and the slope m2 of the transfer line C3 are different, the gain error of the current sensing circuit 12 is introduced. As a result, the digital code is also introduced to the current sensing circuit 12. In practice, both offset error and gain error are introduced to the current sensing circuit 12. Thus, when the "ideal" transfer line C1 is defined as y=(m1)x, the "real" transfer line can be defined as y=(m2)x+b.

Figure 3A:
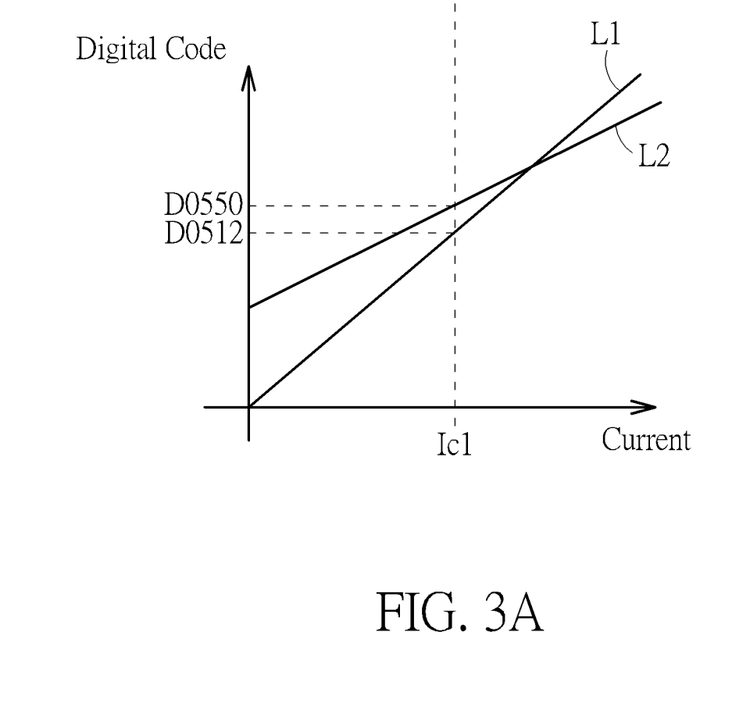
FIG. 3A is an illustration of calibrating the offset error of the current sensing circuit of the current sensing calibration system in FIG. 1.

FIG. 3A is an illustration of calibrating the offset error of the current sensing circuit 12 of the current sensing calibration system 100. In the embodiment, the processor 13 can select a current range of 0~1 uA according to Table T1. The first digital code can be a 10-bit based code, as D[0:9]. A value range of the first digital code D[0:9] can be written as D0001 to D1024. Therefore, the current range 0~1 uA can be quantized as 1024 quantization steps. The processor 13 can select a first calibration current and a first ideal digital code corresponding to the first calibration current saved in the memory MEM. For example, the first calibration current Ic1 can be selected as 0.5 uA. The first ideal digital code can be selected as D[0:9]=D0512. In FIG. 3A, X-axis is the current. Y-axis is the digital code. For an ideal transfer line L1, when the first calibration current Ic1 is 0.5 uA, the first ideal digital code outputted from the current sensing circuit 12 is D[0:9]=D0512. As mentioned previously, the offset error may be introduced to the current sensing circuit 12. In other words, when the first calibration current Ic1 is inputted to the current sensing circuit 12, the first "real" digital code may be outputted as D0550 according to a "real" transfer line L2. Therefore, the offset error can be obtained as a difference between the first real digital code D550 and the first ideal digital code D512.

Figure 3B:
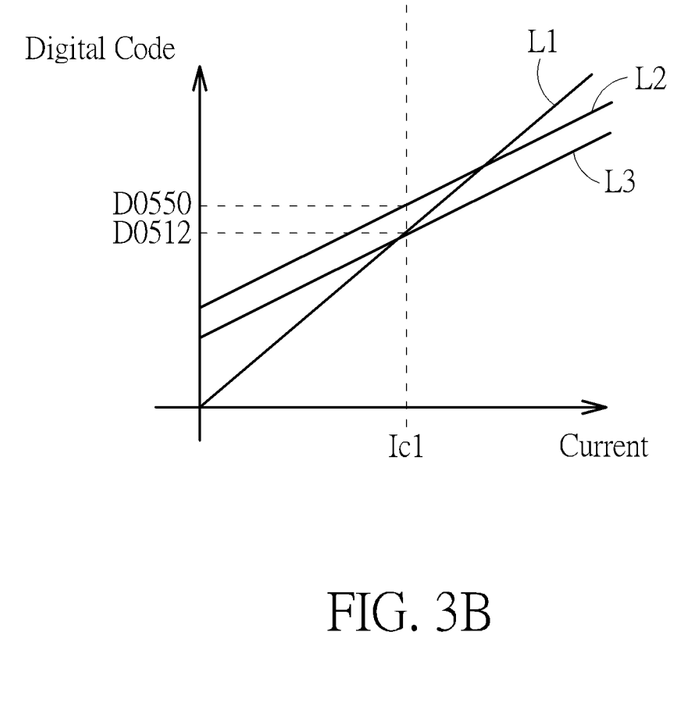
FIG. 3B is an illustration of a calibration result after the offset error of the current sensing circuit of the current sensing calibration system in FIG. 1 is calibrated.

FIG. 3B is an illustration of a calibration result after the offset error of the current sensing circuit of the current sensing calibration system 100 is calibrated. As previously mentioned, the offset error can be obtained as the difference between the first real digital code D550 and the first ideal digital code D512. The offset error can be regarded as the offset calibration data for calibrating the real transfer line L2. In FIG. 3B, the real transfer line L2 can be calibrated by shifting D550−D512=38 code quantization code space for generating a transfer line L3. In other words, the offset calibration data can be used for compensating an offset data code (i.e., D550) of the real transfer line L2 of the current sensing circuit 12.

Figure 4A:
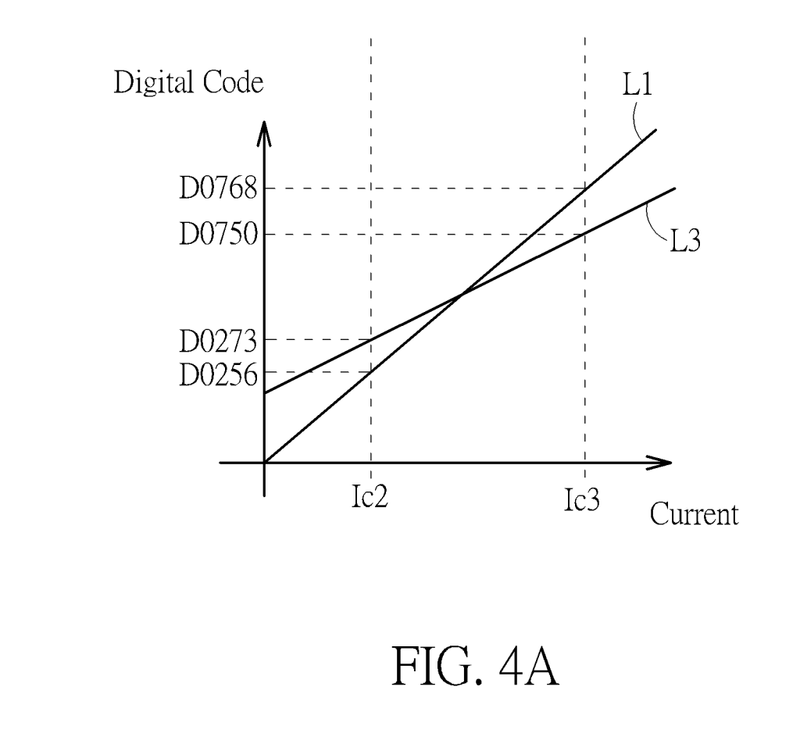
FIG. 4A is an illustration of calibrating the gain error of the current sensing circuit of the current sensing calibration system in FIG. 1.

FIG. 4A is an illustration of calibrating the gain error of the current sensing circuit 12 of the current sensing calibration system 100. After the real transfer line L2 is calibrated to generate the transfer line L3 by shifting D550−D512=38 code quantization code space, the transfer line L3 is further calibrated for generating a transfer line L4 by adjusting a slope of the transfer line L3, as illustrated below. The processor 13 can select a second calibration current and a second ideal digital code corresponding to the second calibration current saved in the memory MEM. For example, the second calibration current Ic2 can be selected as 0.25 uA. The second ideal digital code can be selected as D[0:9]=D0256. Further, the processor 13 can select a third calibration current and a third ideal digital code corresponding to the third calibration current saved in the memory MEM. For example, the third calibration current Ic3 can be selected as 0.75 uA. The third ideal digital code can be selected as D[0:9]=D0768. For the ideal transfer line L1, when the second calibration current Ic2 is 0.25 uA, the second ideal digital code outputted from the current sensing circuit 12 is D[0:9]=D0256. When the third calibration current Ic2 is 0.75 uA, the third ideal digital code outputted from the current sensing circuit 12 is D[0:9]=D0768. As mentioned previously, the gain error may be introduced to the current sensing circuit 12. In other words, when the second calibration current Ic2 is inputted to the current sensing circuit 12, the second "real" digital code may be outputted as D0273 according to the transfer line L3. Similarly, when the third calibration current Ic3 is inputted to the current sensing circuit 12, the third "real" digital code may be outputted as D0750 according to the transfer line L3. In other words, the processor 13 can generate a real slope of the transfer line L3 according to the second real digital code D0273 and the third real digital code D0768. Further, the processor 13 can generate an ideal slope of the transfer line L1 according to the second ideal digital code D0256 and the third ideal digital code D0768. Therefore, the gain error can be obtained as a difference between the real slope and the ideal slope.

Figure 4B:
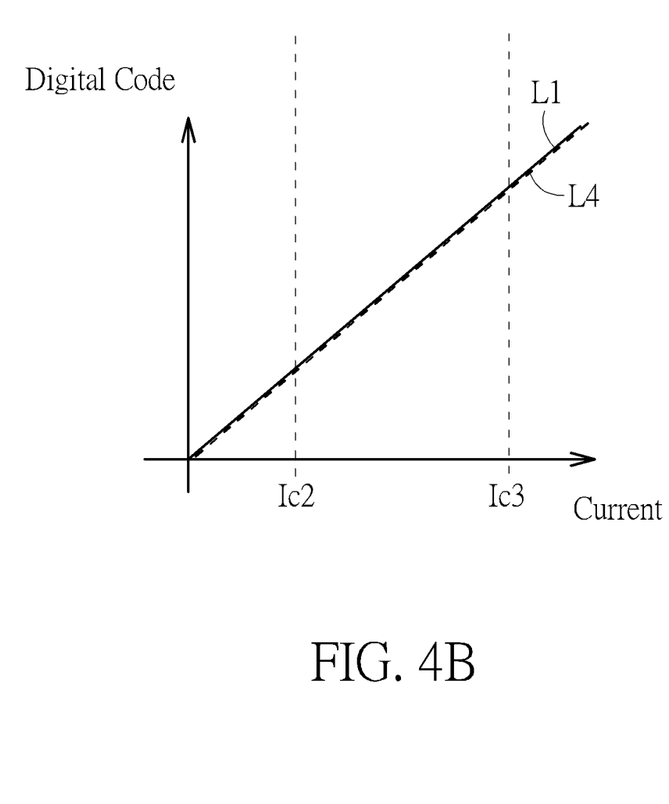
FIG. 4B is an illustration of a calibration result after the gain error of the current sensing circuit of the current sensing calibration system in FIG. 1 is calibrated.

FIG. 4B is an illustration of a calibration result after the gain error of the current sensing circuit 12 of the current sensing calibration system 100 is calibrated. As previously mentioned, the gain error can be obtained as the difference between the real slope and the ideal slope. The gain error can be regarded as the gain calibration data for calibrating the transfer line L3. In other words, the gain calibration data can be used for compensating a slope error of the transfer line L3 to generate a transfer line L4. Particularly, in FIG. 3A to FIG. 4B, after the offset error and the gain error are calibrated, the transfer line L4 can approach the transfer line L1. Therefore, in FIG. 1, the error of the digital code D1 can be corrected for generating a calibrated digital code D2. As a result, no offset error or gain error is introduced to the calibrated digital code D2. Accuracy of detecting temperature of the display panel 20 can be improved. Further, the first calibration current Ic1, the first ideal digital code, the second calibration current Ic2, the second ideal digital code, the third calibration current Ic3, and the third ideal digital code can be predetermined and saved in the memory MEM of the processor 13.

Figure 5:
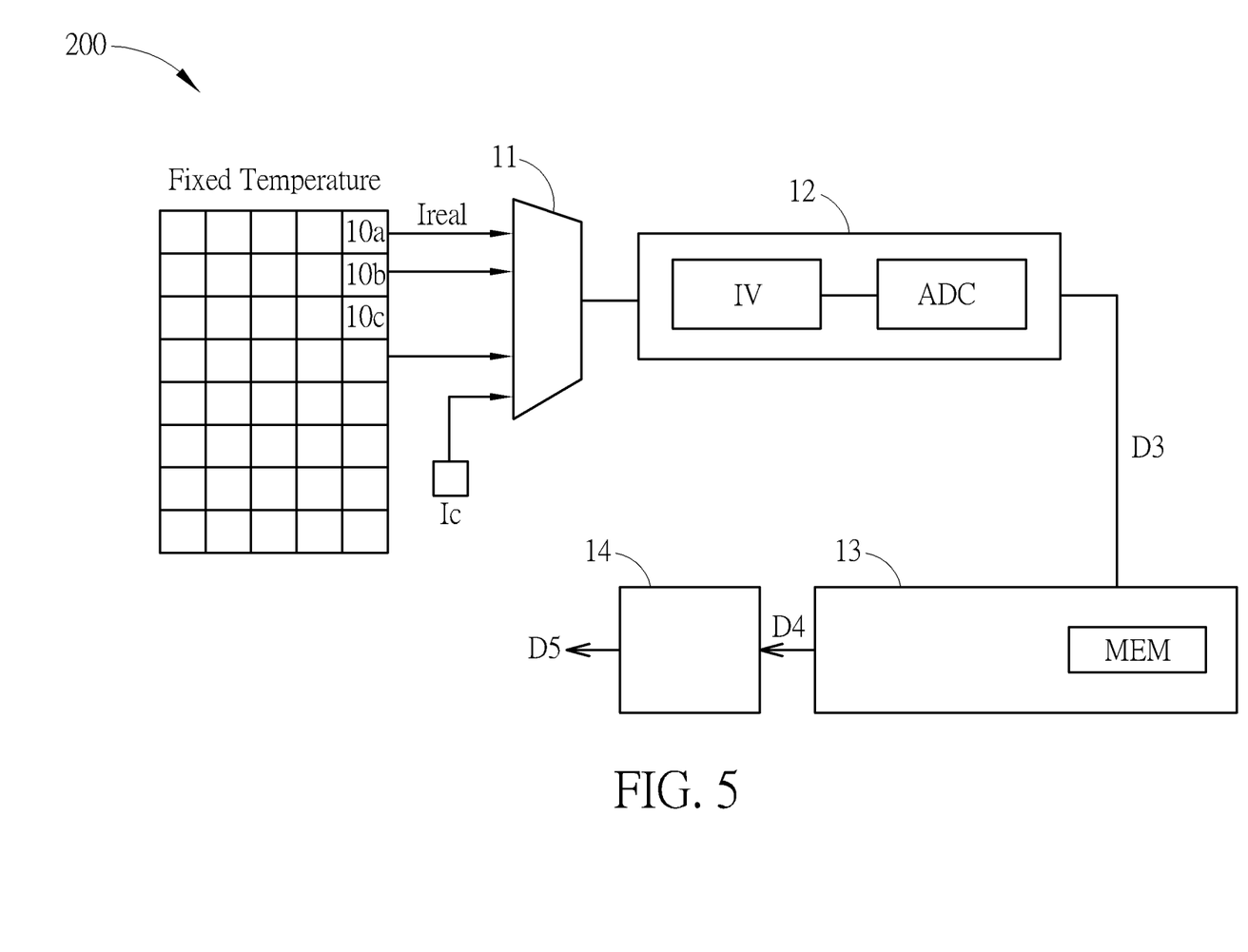
FIG. 5 is an illustration of calibrating channel temperature data of the current sensing calibration system in FIG. 1.

FIG. 5 is an illustration of calibrating channel temperature data of the current sensing calibration system 100. To further improve the accuracy of detecting pixel temperature, current variations of the pixels under a fixed temperature may be considered. For example, a real pixel current Ireal of the at least one pixel 10a, 10b, and/or 10c of the display panel 20 can be inputted to the current sensing circuit 12 under the fixed temperature (i.e., 65 degrees Celsius). Then, the processor 13 can detect a real pixel digital code D3 outputted by the current sensing circuit 12 after the current sensing circuit 12 is calibrated according to the offset calibration data and the gain calibration data. Further, the processor 13 can acquire an ideal pixel digital code corresponding to the fixed temperature for generating the channel temperature calibration data, as illustrated in Table T2.

TABLE T2

| Fixed temperature | Ideal pixel digital code | Real pixel digital code | Channel temperature calibration data |
|---|---|---|---|
| Pixel 10a (CH1) | D[9:0] | D_CH1[9:0] | δCH1 |
| Pixel 10b (CH1) | D[9:0] | D_CH2[9:0] | δCH2 |
| Pixel 10c (CH3) | D[9:0] | D_CH3[9:0] | δCH3 |

Here, for the fixed temperature, since working states and circuit lifetimes of the pixels 10a, 10b, and 10c are different, the real pixel digital codes received by the current sensing circuit 12 are different. For example, for the fixed temperature, the real pixel digital code of channel 1 corresponding to the pixel 10a is D_CH1[9:0]. The real pixel digital code of channel 2 corresponding to the pixel 10b is D_CH2[9:0]. The real pixel digital code of channel 3 corresponding to the pixel 10c is D_CH3[9:0]. The ideal pixel digital code for pixels 10a, 10b, and 10c under the fixed temperature is D[9:0]. Therefore, the channel temperature calibration data can be generated by according to a difference between the real pixel digital code and the ideal pixel digital code in each channel. For example, the channel temperature calibration data δCH1 of the channel 1 corresponding to pixel 10a is generated by a difference between D[9:0] and D_CH1[9:0]. The channel temperature calibration data δCH2 of the channel 2 corresponding to pixel 10b is generated by a difference between D[9:0] and D_CH2[9:0]. The channel temperature calibration data δCH3 of the channel 3 corresponding to pixel 10c is generated by a difference between D[9:0] and D_CH3[9:0]. In other words, in FIG. 5, the real pixel digital code D3 can be calibrated to generate the pixel digital code D4 by removing the offset error and the gain error. Then, the digital code D4 can be further calibrated by a temperature compensation circuit 14 for removing code bias caused by the temperature. As a result, the digital code D5 approaches the real digital code since the offset error, the gain error, and the temperature code bias are removed. Particularly, the temperature compensation circuit 14 can be integrated into the processor 13. The temperature compensation circuit 14 can be coupled to the processor 13. Any reasonable technology or hardware modification falls into the scope of the present invention.

Figure 6:
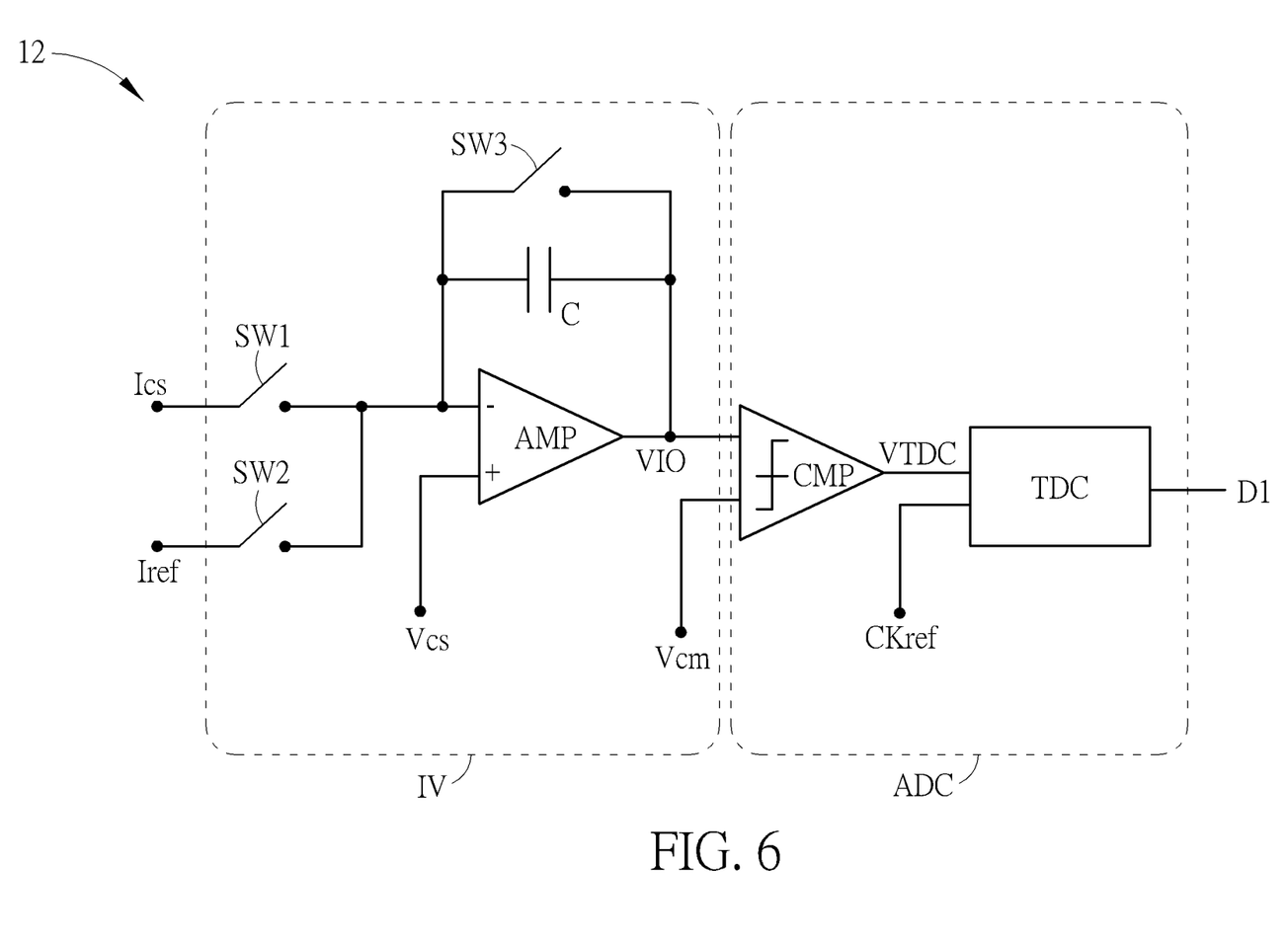
FIG. 6 is a circuit structure of the current sensing circuit of the current sensing calibration system in FIG. 1.

FIG. 6 is a circuit structure of the current sensing circuit 12 of the current sensing calibration system 100. The current sensing circuit 12 includes the current-to-voltage converter IV for converting a current signal to a voltage signal, and an analog-to-digital converter ADC coupled to the current-to-voltage converter IV for digitizing the voltage signal to a digital code. Circuit details of the current sensing circuit 12 are illustrated below. The current sensing circuit 12 includes a first switch SW1, a second switch SW2, an amplifier AMP, a capacitor C, a third switch SW3, a comparator CMP, and a time-to-digital converter TDC. The first switch SW1 includes an input terminal coupled to the multiplexer 11 for receiving a current Ics, and an output terminal. The second switch SW2 includes an input terminal for receiving a reference current Iref, and an output terminal coupled to the output terminal of the first switch SW1. The amplifier AMP includes a first input terminal coupled to the output terminal of the first switch SW1, a second terminal for receiving a first reference voltage Vcs, and an output terminal. The capacitor C includes a first terminal coupled to the first input terminal of the amplifier AMP, a second terminal coupled to the output terminal of the amplifier AMP. The third switch SW3 includes an input terminal coupled to the first input terminal of the capacitor C, and an output terminal coupled to the second terminal of the capacitor C. The comparator CMP includes a first input terminal coupled to the output terminal of the amplifier AMP, a second input terminal for receiving a second reference voltage Vcm, and an output terminal. The time-to-digital converter TDC includes a first input terminal coupled to the output terminal of the comparator CMP, a second input terminal for receiving a reference clock signal CKref, and an output terminal for outputting the digital code D1.

Figure 7:
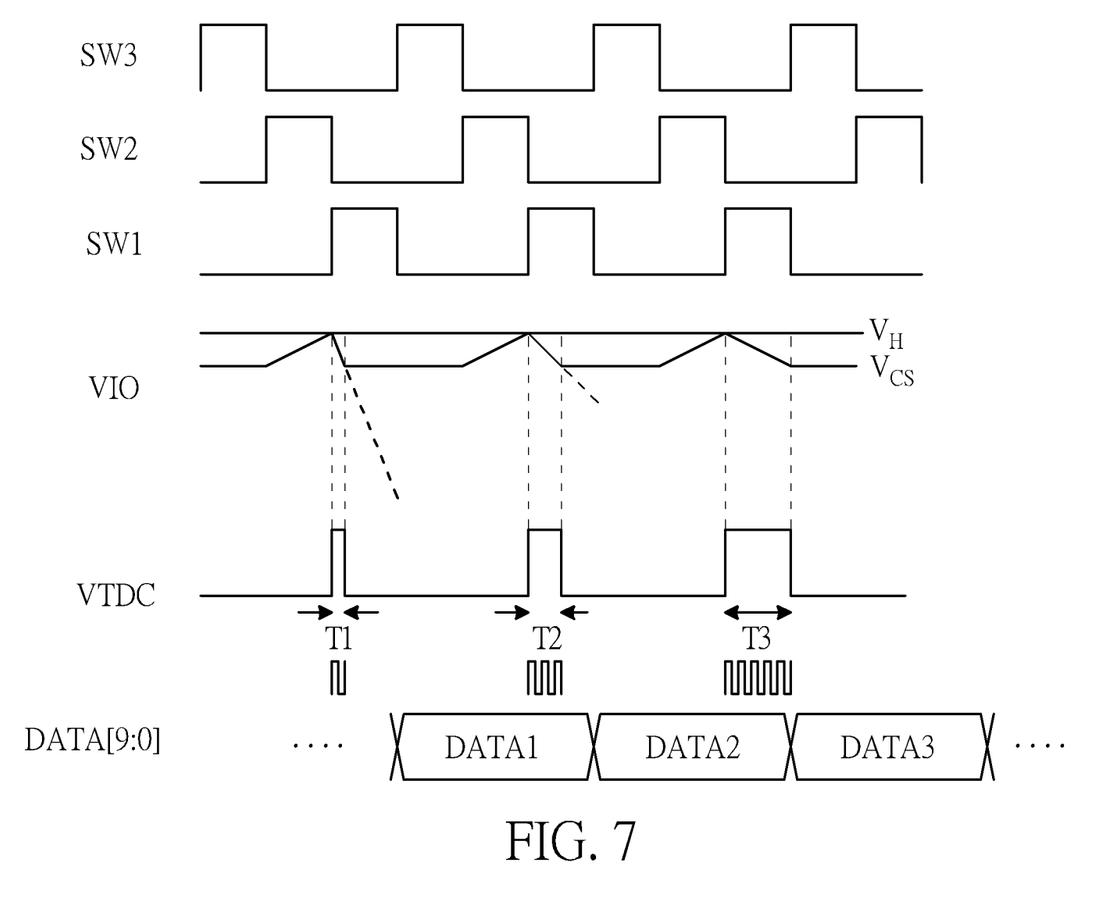
FIG. 7 is an illustration of waveforms of the current sensing circuit of the current sensing calibration system in FIG. 1.

FIG. 7 is an illustration of waveforms of the current sensing circuit 12 of the current sensing calibration system 100. In FIG. 7, a waveform of controlling the first switch SW1, a waveform of controlling the second switch SW2, a waveform of controlling the third switch SW3, a waveform of the output voltage VIO at the output terminal of the amplifier AMP, a waveform of the output voltage VTDC at the output terminal of the comparator CMP, and the digital code D1 expressed as DATA[9:0] are illustrated. In the current sensing circuit 12, the capacitor C can be adjusted according to a standard design. Then, the reference current Iref can be adjusted according to the capacitor C. The second switch SW2 can be used for pre-charging the capacitor C according to a pre-charge clock having a fixed pulse width. Here, the capacitor C can be charged to reach a pre-charge voltage VH when the second switch SW2 is enabled. Then, the capacitor C can be discharged to reach the first reference voltage Vcs when the second switch SW2 is disabled and the first switch SW1 is enabled. Further, the third switch SW3 can be used for resetting a charge state of the capacitor C for each clock period. The pre-charge voltage VH is greater than the first reference voltage Vcs. In the current sensing circuit 12, the first reference voltage Vcs can be adjusted. When the first reference voltage Vcs is changed, the pre-charge voltage VH of the capacitor C is changed accordingly. Further, when the output voltage VTDC of the comparator CMP is designed to be irrelevant to variations of the reference voltage Vcs, the second reference voltage Vcm is also adjusted. In other words, when the first reference voltage Vcs is changed, the second reference voltage Vcm is adjusted for stabilizing the output voltage VTDC of the comparator CMP.

In the current sensing circuit 12, when the capacitor C is charged to reach the pre-charge voltage VH, the output terminal of the comparator C is at a high voltage (i.e., VIO=VH). When the capacitor C is discharged to reach the first reference voltage Vcs, the output terminal of the comparator C is at a low voltage (i.e., VIO=Vcs). Further, the time-to-digital converter TDC can use a fixed reference clock CKref for counting a transition time length of the output voltage VTDC of the comparator CMP. For example, a time length of discharging the capacitor C from the pre-charge voltage VH to the first reference voltage Vcs can be digitized to generate the digital code by the time-to-digital converter TDC. For example, a time length T1 of discharging the capacitor C can be digitized to generate the digital code DATA1. A time length T2 of discharging the capacitor C can be digitized to generate the digital code DATA2. A time length T3 of discharging the capacitor C can be digitized to generate the digital code DATA3.

Figure 8:
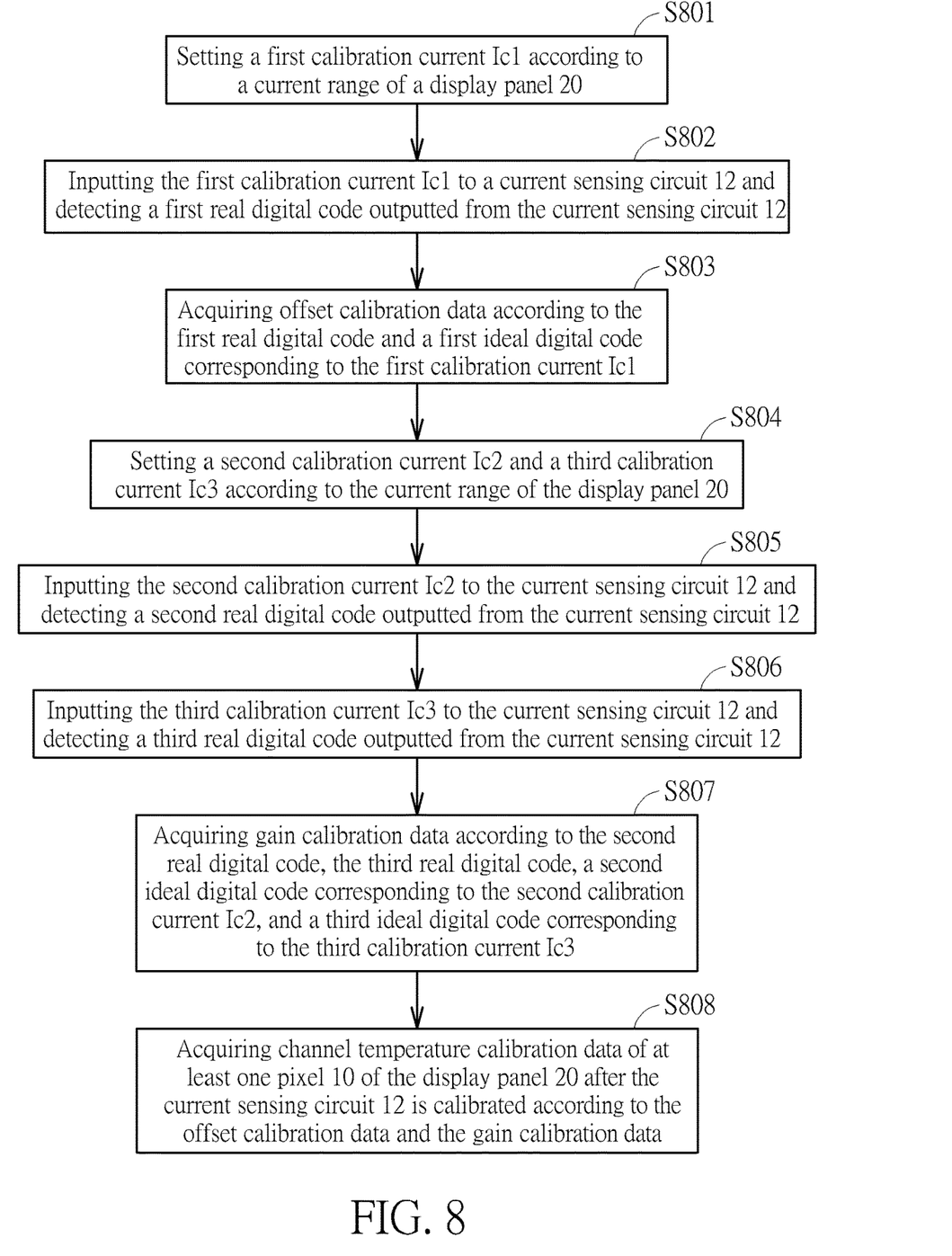
FIG. 8 is a current sensing calibration method performed by the current sensing calibration system in FIG. 1.

FIG. 8 is a current sensing calibration method performed by the current sensing calibration system 100. The current sensing calibration method includes step S801 to step S808. Any reasonable technology modification falls into the scope of the present invention. Step S801 to step 808 are illustrated below.

Step S801: setting a first calibration current Ic1 according to a current range of a display panel 20;

Step S802: inputting the first calibration current Ic1 to a current sensing circuit 12 and detecting a first real digital code outputted from the current sensing circuit 12;

Step S803: acquiring offset calibration data according to the first real digital code and a first ideal digital code corresponding to the first calibration current Ic1;

Step S804: setting a second calibration current Ic2 and a third calibration current Ic3 according to the current range of the display panel 20;

Step S805: inputting the second calibration current Ic2 to the current sensing circuit 12 and detecting a second real digital code outputted from the current sensing circuit 12;

Step S806: inputting the third calibration current Ic3 to the current sensing circuit 12 and detecting a third real digital code outputted from the current sensing circuit 12;

Step S807: acquiring gain calibration data according to the second real digital code, the third real digital code, a second ideal digital code corresponding to the second calibration current Ic2, and a third ideal digital code corresponding to the third calibration current Ic3;

Step S808: acquiring channel temperature calibration data of at least one pixel 10 of the display panel 20 after the current sensing circuit 12 is calibrated according to the offset calibration data and the gain calibration data.

Details of step S801 to step S808 are previously illustrated. Thus, they are omitted here. In the current sensing calibration system 100, since the offset error, the gain error, and the temperature code bias are removed, the digital code of detecting temperature approaches the real digital code. As a result, the accuracy of generating the digital code for applying various temperature compensation processes can be improved.

To sum up, the present invention discloses a current sensing calibration method and a current sensing calibration system. The current sensing calibration system can use calibration currents for detecting and correcting the offset error and the gain error. Further, the current sensing calibration system can generate channel temperature calibration data of at least one pixel of the display panel for correcting the temperature code bias. As a result, the current sensing calibration system can provide a reliable digital code for applying various temperature compensation processes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current sensing calibration method comprising:
setting a first calibration current according to a current range of a display panel;
inputting the first calibration current to a current sensing circuit and detecting a first real digital code outputted from the current sensing circuit;
acquiring offset calibration data according to the first real digital code and a first ideal digital code corresponding to the first calibration current;
setting a second calibration current and a third calibration current according to the current range of the display panel;
inputting the second calibration current to the current sensing circuit and detecting a second real digital code outputted from the current sensing circuit;
inputting the third calibration current to the current sensing circuit and detecting a third real digital code outputted from the current sensing circuit;
acquiring gain calibration data according to the second real digital code, the third real digital code, a second ideal digital code corresponding to the second calibration current, and a third ideal digital code corresponding to the third calibration current Ic3; and
acquiring channel temperature calibration data of at least one pixel of the display panel after the current sensing circuit is calibrated according to the offset calibration data and the gain calibration data.

2. The method of claim 1, wherein the offset calibration data is generated according to a difference between the first real digital code and the first ideal digital code.

3. The method of claim 1, further comprising:
generating a real slope according to the second real digital code and the third real digital code; and
generating an ideal slope according to the second ideal digital code and the third ideal digital code;
wherein the gain calibration data is generated by a difference between the real slope and the ideal slope.

4. The method of claim 1, further comprising:
inputting a real pixel current of the at least one pixel of the display panel to the current sensing circuit under a fixed temperature;
detecting a real pixel digital code outputted by the current sensing circuit after the current sensing circuit is calibrated according to the offset calibration data and the gain calibration data;
acquiring an ideal pixel digital code corresponding to the fixed temperature for generating the channel temperature calibration data;
wherein the channel temperature calibration data is generated by according to a difference between the real pixel digital code and the ideal pixel digital code.

5. The method of claim 1, wherein the current sensing circuit comprises a current-to-voltage converter and an analog-to-digital converter.

6. The method of claim 5, wherein the offset calibration data is used for compensating an offset data code of the current sensing circuit.

7. The method of claim 5, wherein the gain calibration data is used for compensating a slope of a transfer line of the current sensing circuit.

8. The method of claim 1, wherein the first calibration current, the first ideal digital code, the second calibration current, the second ideal digital code, the third calibration current, and the third ideal digital code are predetermined and saved in a memory.

9. A current sensing calibration system comprising:
at least one pixel disposed on a display panel;
a multiplexer coupled to the at least one pixel and a current calibration terminal;
a current sensing circuit coupled to the multiplexer and configured to generate digital data associating with a temperature of the at least one pixel; and
a processor coupled to the current sensing circuit and configured to calibrate the digital data of the current sensing circuit;
wherein the processor sets a first calibration current according to a current range of the display panel, the first calibration current is inputted to the current calibration terminal and received by the current sensing circuit through the multiplexer, the processor detects a first real digital code outputted from the current sensing circuit, the processor acquires offset calibration data according to the first real digital code and a first ideal digital code corresponding to the first calibration current, the processor sets a second calibration current and a third calibration current according to the current range of the display panel, the second calibration current is inputted to the current calibration terminal and received by the current sensing circuit through the multiplexer, the processor detects a second real digital code outputted from the current sensing circuit, the third calibration current is inputted to the current calibration terminal and received by the current sensing circuit through the multiplexer, the processor detects a third real digital code outputted from the current sensing circuit, the processor acquires gain calibration data according to the second real digital code, the third real digital code, a second ideal digital code corresponding to the second calibration current, and a third ideal digital code corresponding to the third calibration current, and the processor acquires channel temperature calibration data of the at least one pixel of the display panel after the current sensing circuit is calibrated according to the offset calibration data and the gain calibration data.

10. The system of claim 9, wherein the offset calibration data is generated according to a difference between the first real digital code and the first ideal digital code.

11. The system of claim 9, wherein the processor generates a real slope according to the second real digital code and the third real digital code, the processor generates an ideal slope according to the second ideal digital code and the third ideal digital code, and the gain calibration data is generated by a difference between the real slope and the ideal slope.

12. The system of claim 9, wherein a real pixel current of the at least one pixel of the display panel is inputted to the current sensing circuit under a fixed temperature, the processor detects a real pixel digital code outputted by the current sensing circuit after the current sensing circuit is calibrated according to the offset calibration data and the gain calibration data, the processor acquires an ideal pixel digital code corresponding to the fixed temperature for generating the channel temperature calibration data, and the channel temperature calibration data is generated by according to a difference between the real pixel digital code and the ideal pixel digital code.

13. The system of claim 9, wherein the current sensing circuit comprises:
    a current-to-voltage converter configured to convert a current signal to a voltage signal; and
    an analog-to-digital converter coupled to the current-to-voltage converter and configured to digitize the voltage signal to a digital code.

14. The system of claim 13, wherein the offset calibration data is used for compensating an offset data code of a transfer line of the current sensing circuit.

15. The system of claim 13, wherein the gain calibration data is used for compensating a slope of a transfer line of the current sensing circuit.

16. The system of claim 9, wherein the first calibration current, the first ideal digital code, the second calibration current, the second ideal digital code, the third calibration current, and the third ideal digital code are predetermined and saved in a memory of the processor.

17. The system of claim 9, wherein the current sensing circuit comprises:
    a first switch comprising:
        an input terminal coupled to the multiplexer; and
        an output terminal;
    a second switch comprising:
        an input terminal configured to receive a reference current; and
        an output terminal coupled to the output terminal of the first switch;
    an amplifier comprising:
        a first input terminal coupled to the output terminal of the first switch;
        a second terminal configured to receive a first reference voltage; and
        an output terminal;
    a capacitor comprising:
        a first terminal coupled to the first input terminal of the amplifier; and
        a second terminal coupled to the output terminal of the amplifier;
    a third switch comprising:
        an input terminal coupled to the first input terminal of the capacitor; and
        an output terminal coupled to the second terminal of the capacitor;
    a comparator comprising:
        a first input terminal coupled to the output terminal of the amplifier;
        a second input terminal configured to receive a second reference voltage; and
        an output terminal; and
    a time-to-digital converter comprising:
        a first input terminal coupled to the output terminal of the comparator;
        a second input terminal configured to receive a reference clock signal; and
        an output terminal configured to output a digital code.

18. The system of claim 17, wherein the capacitor is charged to reach a pre-charge voltage when the second switch is enabled, the capacitor is discharged to reach the first reference voltage when the second switch is disabled and the first switch is enabled, the third switch is used for resetting a charge state of the capacitor for each clock period, and the pre-charge voltage is greater than the first reference voltage.

19. The system of claim 18, wherein when the capacitor is charged to reach the pre-charge voltage, the output terminal of the comparator is at a high voltage, and when the capacitor is discharged to reach the first reference voltage, the output terminal of the comparator is at a low voltage.

20. The system of claim 18, wherein a time length of discharging the capacitor from the pre-charge voltage to the first reference voltage is digitized to generate the digital code by the time-to-digital converter, and when the first reference voltage is changed, the second reference voltage is adjusted for stabilizing an output of the comparator.

* * * * *